(12) United States Patent
Katayama et al.

(10) Patent No.: US 7,746,022 B2
(45) Date of Patent: Jun. 29, 2010

(54) STEPPING MOTOR CONTROLLER AND STEPPING MOTOR CONTROL PROGRAM

(75) Inventors: Yoshiki Katayama, Hachioji (JP); Satoshi Ogata, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 295 days.

(21) Appl. No.: 11/872,951

(22) Filed: Oct. 16, 2007

(65) Prior Publication Data

US 2008/0164835 A1    Jul. 10, 2008

(30) Foreign Application Priority Data

Dec. 1, 2006    (JP)    ............................. 2006-325502

(51) Int. Cl.
*G05B 19/40*    (2006.01)
(52) U.S. Cl. .................. 318/685; 318/696; 318/562
(58) Field of Classification Search ............. 318/685, 318/696, 562, 603, 676, 628; 475/216
See application file for complete search history.

(56) References Cited

U.S. PATENT DOCUMENTS

| 6,217,478 | B1 * | 4/2001 | Vohmann et al. | ............... | 477/50 |
| 2003/0178965 | A1 * | 9/2003 | Kuwano et al. | ............. | 318/685 |
| 2004/0032818 | A1 * | 2/2004 | Toyama et al. | ............... | 369/215 |

FOREIGN PATENT DOCUMENTS

JP    2004-215440    7/2004

* cited by examiner

*Primary Examiner*—Karen Masih
(74) *Attorney, Agent, or Firm*—Cantor Colburn LLP

(57) ABSTRACT

A stepping motor controller for controlling a stepping motor which drives a load, including: a load drive state detection section which detects a driving state of the load; and a control section which controls the stepping motor, when a detection result of the load drive state detection section is beyond a prescribed range, so as to maintain a driving speed of the load, and when the detection result of the load drive state detection section is within the prescribed range, so as to control the driving state of the load based on a control pattern.

18 Claims, 5 Drawing Sheets

STEPPING MOTOR CONTROLLER AND STEPPING MOTOR CONTROL PROGRAM

CROSS REFERENCE TO RELATED APPLICATION

The present application is based on Japanese Patent Application No. 2006-325502 filed with Japanese Patent Office on Dec. 1, 2006, the entire content of which is hereby incorporated by reference.

BACKGROUND OF THE INVENTION

1. Field of Technology

The present invention relates to a stepping motor controller for controlling a stepping motor for driving various loads and a stepping motor control program for operating the stepping motor.

2. Description of Related Art

In recent years, as various drive sources, a stepping motor has been widely used. The stepping motor has advantages such that the amount of movement is proportional to the driving pulse number, and the motor is congenial to a digital control circuit, and no feed back circuit is necessary, so that it finds wide applications in various fields.

On the other hand, when the load is excessively high and the pulse frequency is excessively high, a phenomenon that the phase is not switched normally, and asynchronism occurs, and the control is disordered may occur. Further, this state is referred to "step-out".

Further, in Unexamined Japanese Patent Application Publication 2004-215440 (JPA2004-215440), a countermeasure for the aforementioned step-out is disclosed.

In the invention described in JPA2004-215440, the stepping motor is equipped with an encoder, and by comparison of the actual rotation state of the stepping motor with the driving pulse, the step-out is detected.

And, when the step-out is detected, the controller retains the rotational speed, at the point of time when the step-out is eliminated, returns to the ordinary control, and performs a recovery process for recovering a delay or an excessive advance.

Here, if step-out occurs when the stepping motor is controlled in the self-returnable area (self-starting area), the stepping motor can be recovered by applying the aforementioned control.

However, in the high-speed drive state, the phase is switched quickly and a problem arises that even if the same rotational speed is retained, it is difficult to escape from the step-out state. Further, also in a case of a sudden load variance, an escape from the step-out state may be difficult similarly.

One of the objectives of the present invention is to solve the aforementioned problem and to realize a stepping motor controller and a stepping motor control program for preventing the controller, at time of driving, from falling into an unrecoverable step-out state.

SUMMARY

A controller reflecting one aspect of the present invention for solving the aforementioned problem is a stepping motor controller for controlling the stepping motor for driving the load, which includes a load drive state detection section for detecting the drive state of the load and a control section for controlling the stepping motor, when the detection result of the load drive state detection section is beyond a prescribed range, so as to maintain the drive speed of the load and when the detection result of the load drive state detection section is within the prescribed range, so as to control the drive state of the load based on the control pattern.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENT

Hereinafter, the preferred embodiment for executing the present invention will be explained in detail with reference to the accompanying drawings.

<Configuration of the Stepping Motor Controller>

Figure 1:
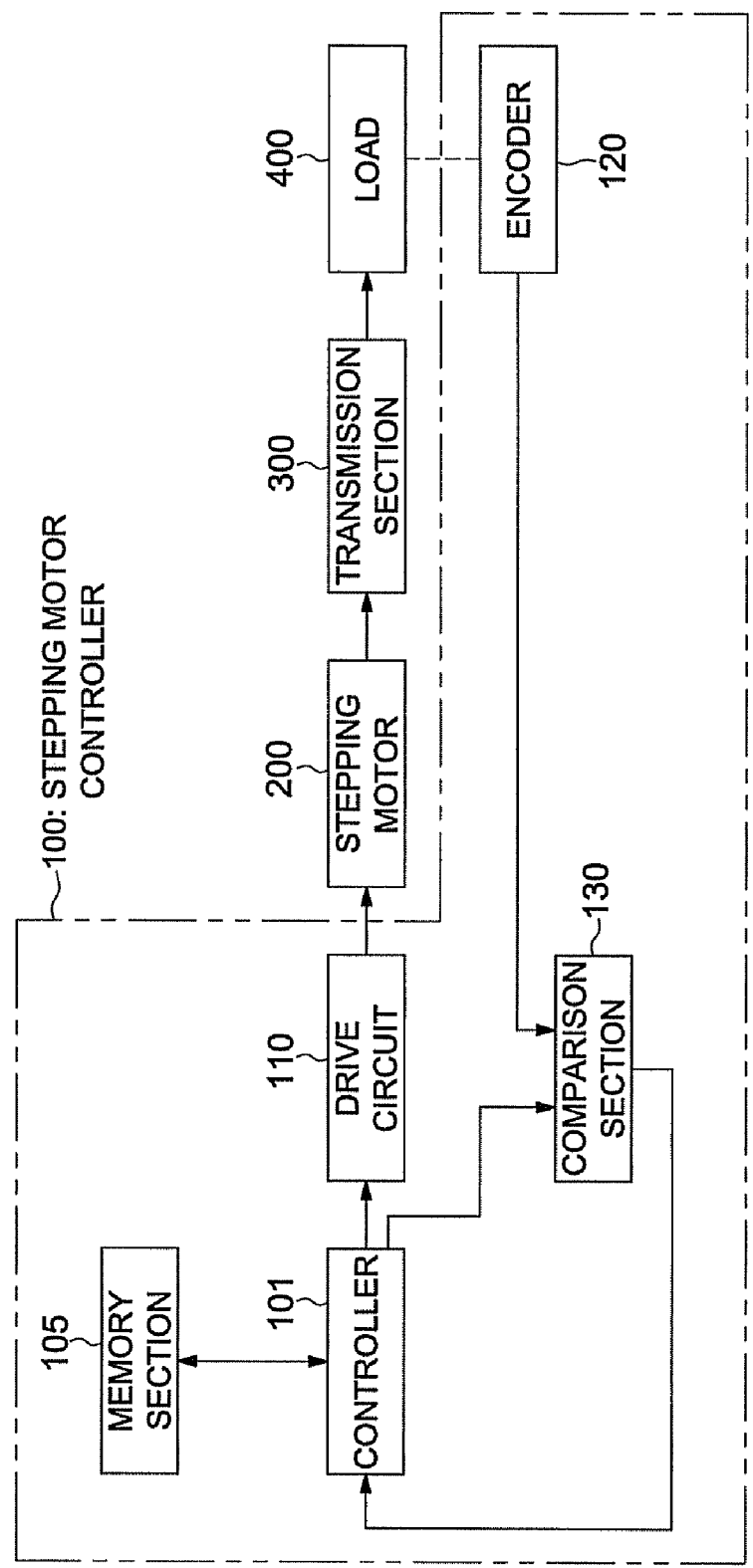
FIG. 1 is a functional block diagram showing the configuration of the stepping motor controller of the embodiment of the present invention.

FIG. 1 is a block diagram showing a stepping motor controller 100 of the first embodiment of the present invention and the peripheral configuration of a stepping motor 200 and a load 400 which are controlled by the stepping motor controller 100.

Further, in FIG. 1, the periphery of the parts necessary for operation explanation of the characteristic parts of this embodiment is recorded mainly and the other known parts of the stepping motor controller, power circuit, and power switch are omitted.

A controller 101 is a control section of the stepping motor controller 100, which controls the stepping motor 200 so as not to control the drive state of the load based on the control pattern when the detection result of the load drive state detection section after the drive state of the load is changed is beyond a prescribed range, and so as to control the drive state of the load based on the control pattern when the detection result of the load drive state detection section is within the prescribed range.

Numeral 105 indicates a memory section composed of a ROM and a RAM, which stores a control program and control pattern data for the controller 101 to control the stepping motor 200.

Numeral 110 indicates a drive circuit for generating a drive signal (drive pulse) for driving the stepping motor 200 under the control of the controller 101.

Numeral 120 indicates an encoder for detecting the drive state of the load 400 which will be described later and it composes the load drive state detection section for generating a detection result according to the drive state of the load 400.

Numeral 130 indicates a comparison section for comparing a control instruction of the controller 101 with the drive state of the load 400, obtaining the difference between them, and feeding it back to the controller 101.

Numeral 200 indicates a stepping motor for making a prescribed revolution under the control of the stepping motor controller 100.

Numeral 300 indicates a transmission section for transferring the rotation of the stepping motor 200 to the load 400 which will be described later, composing a transmission section using connection section such as a belt, a chain, a gear, a shaft, and a pulley.

Numeral 400 indicates a load driven by the stepping motor 200 via the transmission section 300. Further, the load 400 may be connected to the end of the transmission section 300 or may be a different member independent of the transmission section 300 which is driven (rotated or conveyed) by the transmission section 300.

Figure 2:
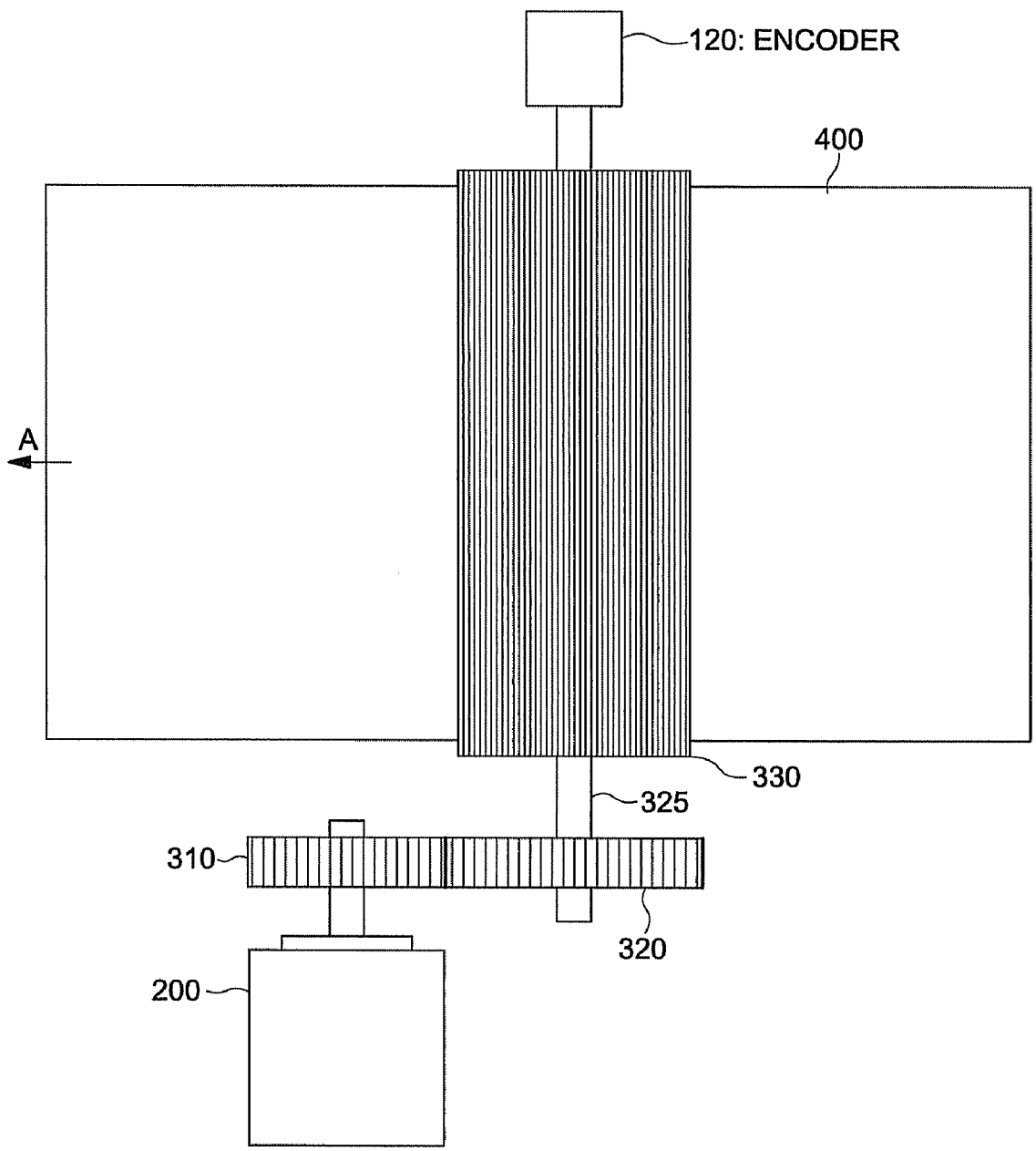
FIG. 2 is a block diagram showing the configuration of the stepping motor controller of the embodiment of the present invention.

Further, the relationship between the stepping motor 200, the transmission section 300, and the load 400, for example, is structured as shown in FIG. 2. The rotation of the stepping motor 200 is transferred to a gear 310 attached to the spindle of the stepping motor 200 and furthermore transferred to a gear 320 arranged so as to mesh with the gear 310. And, a roller 330 attached to a shaft 325 of the gear 320 rotates, thus the load 400 is conveyed in the direction A or in the opposite direction of the direction A. Here, the encoder 120 attached to the shaft 325 detects the drive state of the load 400 via the drive state of the roller 330.

Figure 3:
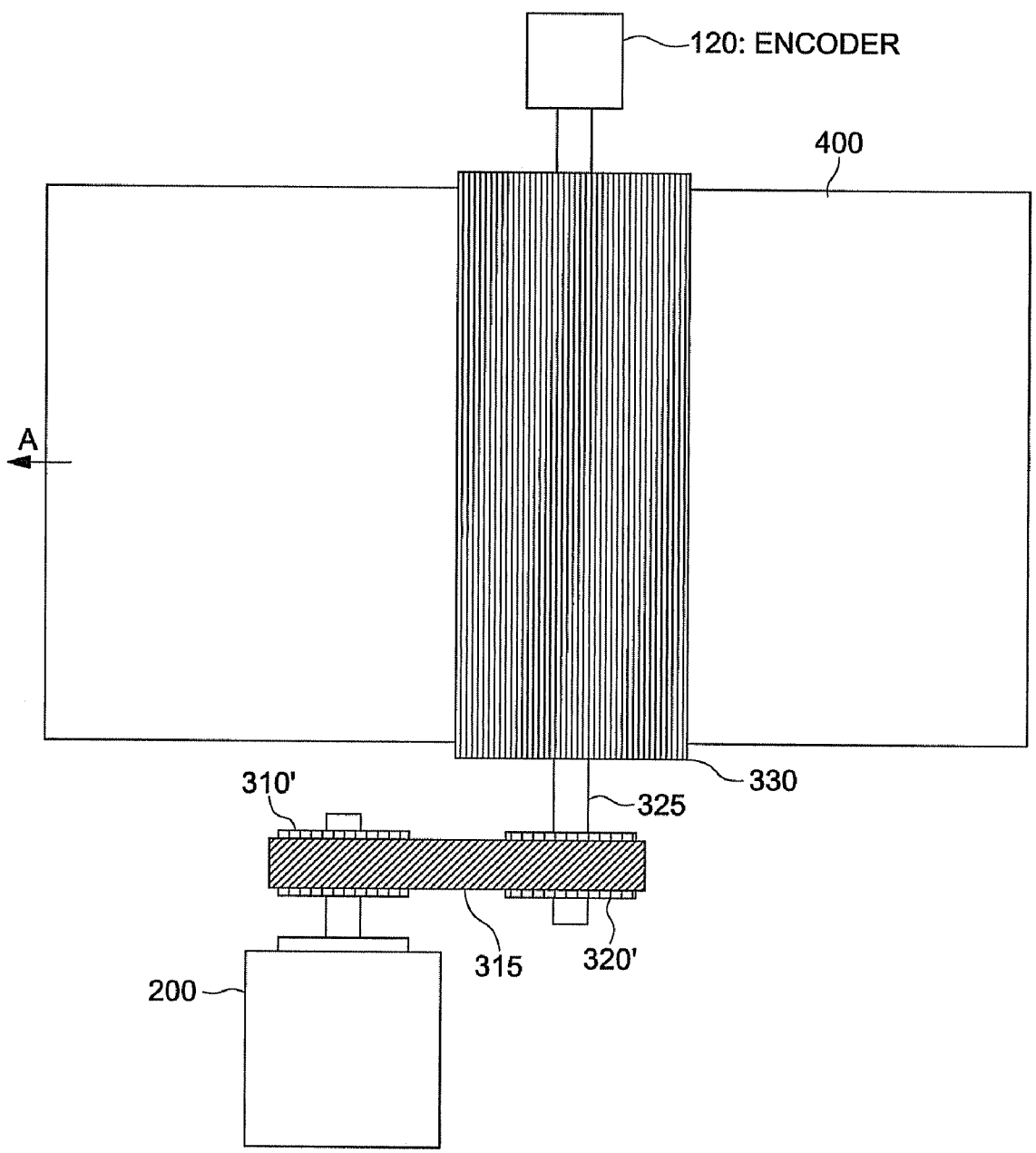
FIG. 3 is a block diagram showing the configuration of the stepping motor controller of the embodiment of the present invention.

Further, the relationship between the stepping motor 200, the transmission section 300, and the load 400, for example, is structured as shown in FIG. 3. The rotation of the stepping motor 200 is transferred to a pulley 310' attached to the spindle of the stepping motor 200 and furthermore transferred to a pulley 320' from the pulley 310' via a belt (or chain) 315. And, the roller 330 attached to the shaft 325 of the pulley 320' rotates, thus the load 400 is conveyed in the direction A or in the opposite direction of the direction A. Here, the encoder 120 attached to the shaft 325 detects the drive state of the load 400 via the drive state of the roller 330.

Further, in FIGS. 2 and 3, the load 400 is a separate member from the transmission section 300, though like a washing bath of a washing machine or tires of a traveling body, the end portion of the transmission section 300 may be the load 400.

<Operation of the Stepping Motor Controller>

Hereinafter, the operation of the stepping motor controller of the first embodiment will be explained in detail by referring to the flow chart and other illustrations.

Figure 4:
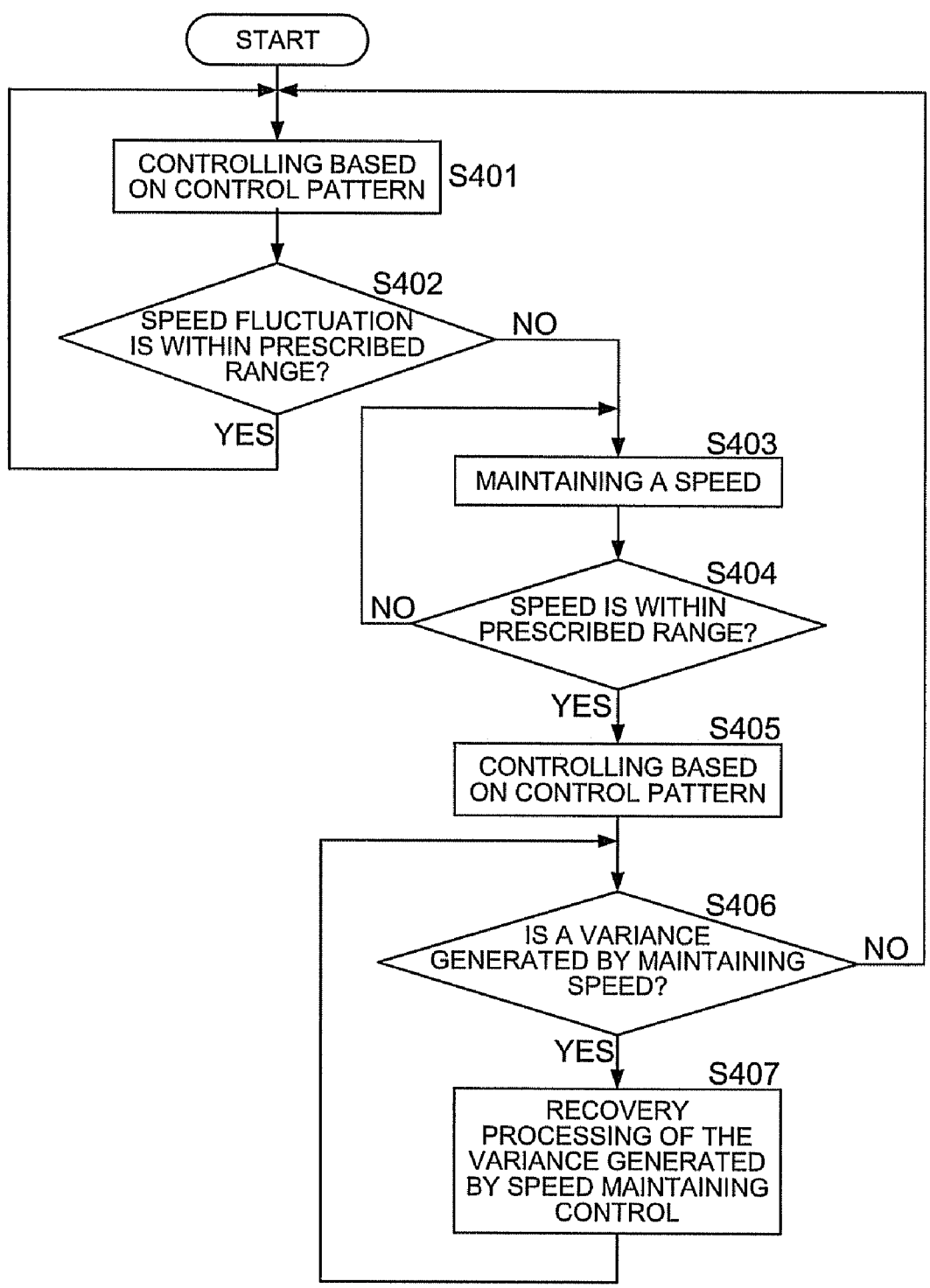
FIG. 4 is a flow chart showing the processing operation of the embodiment of the present invention.

Firstly, the controller 101 allows the drive circuit 110 to output the drive pulse based on the control pattern stored in the memory section 105 and supply it to the stepping motor 200 (Step S401 shown in FIG. 4).

In this case, the drive state of the load 400 is detected by the encoder 120 and the detection result of the encoder 120 is supplied to one input terminal of the comparison section 130. Further, to the other input terminal of the comparison section 130, the control instruction from the controller 101 is inputted.

Here, when the load 400 is driven in the state according to the control instruction of the controller 101, the difference output of the comparison section 130 is adjusted so as to be zero.

Further, the transmission section 300 having the connection section exists and the load 400 has the prescribed moment of inertia, thus actually, the control instruction of the controller 101 and the drive state of the load 400 may not coincide completely with each other. Particularly, in the speed fluctuation (acceleration, deceleration, or stop) in the state including high-speed drive, due to the inertia of the load 400, a vibration based on the delay of the motional state may occur.

Figure 5:
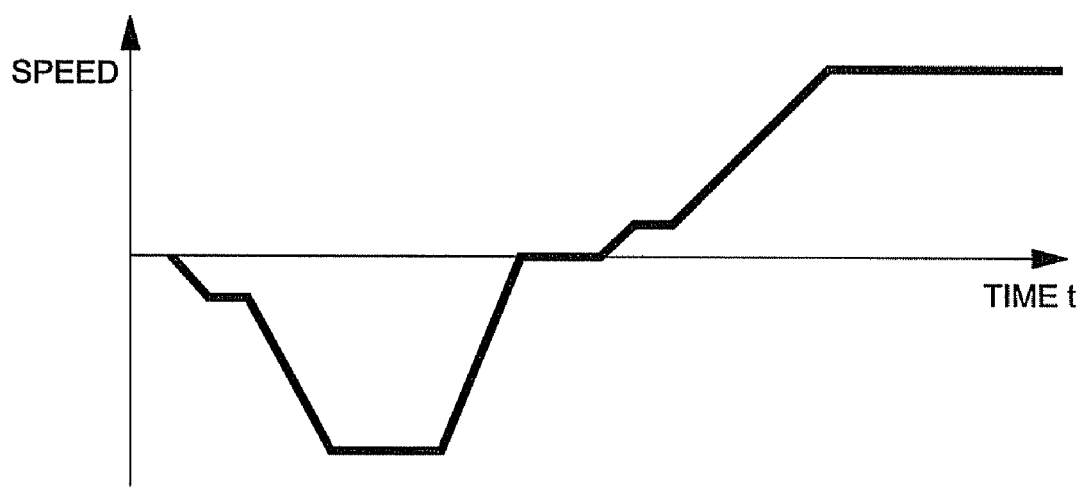
FIGS. 5(a) and 5(b) are characteristic diagrams showing the operation of the embodiment of the present invention.
Figure 5:
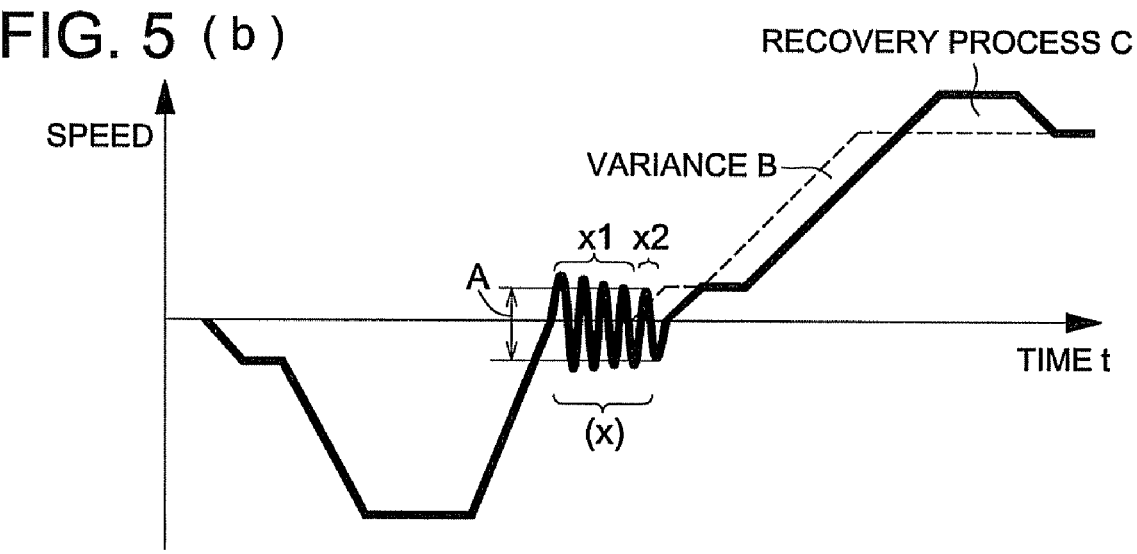

In FIG. 5, when the speed is controlled based on the control pattern shown in (a), actually, at the timing (x) shown in (b), the vibration based on the inertia occurs in correspondence with the stop of the load 400. In this case, due to the speed difference before and after control, the moment of inertia of the load 400, and the backlash and rigidity of the transmission section 300, the amplitude, cycle, and attenuation characteristic of the vibration are decided.

Therefore, the controller 101 periodically refers to the output of the comparison section 130 and monitors the load drive state (Step S402 shown in FIG. 4).

In this case, the speed fluctuation range within which the stepping motor 200 is not put into the step-out state and the drive state can be controlled stably based on the control pattern is predetermined as a "prescribed range". For example, if the output of the comparison section 130 is not stepped out at a value less than A and can be controlled stably, the value A is defined as a value within the prescribed range.

Further, actually, not only the case of stop but also the case of changing the speed from a speed V1 to a speed V2 or the case of reversing the rotational direction, the same phenomenon occurs. Further, due to the moment of inertia of the load 400 and the backlash, rigidity, and number of connection portions of the transmission section 300, the amplitude, cycle, and attenuation characteristic of the vibration generated are changed.

Further, with the control pattern after the vibration occurs, the range within which the drive state can be controlled stably based on the control pattern is varied. For example, when accelerating slowly, A can be set large, while when accelerating suddenly, A must be made smaller. Further, with the torque of the motor or the speed reduction ratio of the transfer section, the effect of the vibration of the load on the stepping motor 200 is varied, so that the setting of A is varied.

Therefore, in a controller used actually, the value A for each speed difference is measured and obtained beforehand and is stored in the memory section 105. Further, the conditions are varied with wear of the gear, roller, and pulley, so that it is desirable to periodically obtain the value A.

And, when the output of the comparison section 130 is less than A, the speed fluctuation of the load 400 is within the prescribed range (YES at Step S402 shown in FIG. 4), so that the controller 101 allows the drive circuit 110 to output the drive pulse based on the control pattern stored in the memory section 105 and supply it to the stepping motor 200 (Step S401 shown in FIG. 4).

On the other hand, when the output of the comparison section 130 is A or more such as x1 of (x) shown in FIG. 5(*b*), the speed fluctuation of the load 400 is not within the prescribed range (NO at Step S402 shown in FIG. 4) and is unstable, so that the controller 101 allows the drive circuit 110 to output the drive pulse for maintaining the drive speed of the load 400 at that point of time and supply it to the stepping motor 200 (S403 shown in FIG. 4).

And, the controller 101 refers to the output of the comparison section 130 and monitors the load drive state (S404 shown in FIG. 4).

Here, when the output of the comparison section 130 is A or more, the speed fluctuation of the load 400 is not within the prescribed range (NO at Step S404 shown in FIG. 4), so that the controller 101 allows the drive circuit 110 to output the drive pulse for maintaining the drive speed of the load 400 at that point of time and supply it to the stepping motor 200 (S403 shown in FIG. 4).

Further, when the output of the comparison section 130 is less than A such as the last x2 of (x) shown in FIG. 5(*b*), the speed fluctuation of the load 400 is within the prescribed range (YES at Step S404 shown in FIG. 4), so that the controller 101 allows the drive circuit 110 to output the drive pulse based on the control pattern stored in the memory section 105 and supply it to the stepping motor 200 (Step S405 shown in FIG. 4).

Further, as shown in FIG. 5(b), when the drive state of the load 400 is stable and the prescribed control pattern is restarted to be driven, between the original control pattern (the dashed line shown in FIG. 5(b)) and the actual control pattern (the solid line shown in FIG. 5(b)), a variance B is generated in the drive state.

Therefore, the controller 101 obtains by calculation whether the variance B is generated by maintaining the speed (Step S403 shown in FIG. 4) (Step S406 shown in FIG. 4). In this case, the controller 101 obtains the variance B from the product of the speed maintaining (Step S403 shown in FIG. 4) time and the speed of the original control pattern.

If the variance B is generated (YES at Step S406 shown in FIG. 4), the controller 101, as a recovery process C, executes control for counterbalancing the variance B.

Namely, when the actual control pattern is retarded from the original control pattern, the controller 101 drives the actual control pattern at a higher speed than that of the original control pattern and executes the recovery process for making up for lost time. Further, when the actual control pattern advances from the original control pattern, the controller 101 drives the actual control pattern at a lower speed than that of the original control pattern and executes the recovery process for making up for the advance. Further, FIG. 5(b) shows an example of the recovery process C when the drive is retarded.

And, when this variance B is eliminated (NO at Step S406 shown in FIG. 4), the controller 101 allows the drive circuit 110 to output the drive pulse based on the control pattern stored in the memory section 105 and supply it to the stepping motor 200 (Step S401 shown in FIG. 4).

And, the controller 101 executes repeatedly the aforementioned processes of monitoring the load drive state, maintaining the speed in the unstable state, returning to the ordinary control pattern when the unstable state is eliminated, and recovering a variance, if any.

As mentioned above, the movement different from the control pattern of the load 400 is detected, thus the situation that the movement (vibration) of the load 400 is reflected on the stepping motor 200 and it may fall into the step-out state is detected, beforehand in the unstable state before the occurrence of step-out, and the step-out can be prevented beforehand, thereby stable drive is enabled.

<Variant Embodiment>

In the embodiment aforementioned, in FIGS. 2 and 3, the concrete example that the load 400 as a conveyed article is conveyed linearly by the roller of the transmission section 300 is shown, though the present invention is not limited to it.

For example, even when the load 400 is driven to rotate or the load 400 is attached to the roller or shaft of the transmission section 300, this embodiment is applied to it, and the movement different from the control pattern of the load 400 is detected, thus the situation that the movement (vibration) of the load 400 is reflected on the stepping motor 200 and it may fall into the step-out state is detected beforehand in the unstable state before the occurrence of step-out, and the step-out can be prevented beforehand, thereby stable drive is enabled.

Further, FIG. 1 shows a block diagram of the controller 101, memory section 105, drive circuit 110, and comparison section 130 which are separated from each other, which is an example showing them according to basic functions.

Therefore, a configuration that the whole or a part of each section is composed of a processor or a program or a configuration that a part or the whole of a plurality of functions is integrated is available. For example, a modification that the inside of the controller 101 or the inside of the drive circuit 110 is given a function equivalent to the comparison section 130 is available.

Further, in the embodiment aforementioned, the example that the encoder 120 is arranged coaxially with the shaft at the end of the transmission section 300 in the neighborhood of the load is shown, though the movement of the load 400 may be detected directly or a vibration at a position of the transmission section 300 other than the end may be detected. For example, when a belt or a chain is used for the transmission section 300, the encoder 120 may be arranged in the neighborhood thereof.

Further, a load drive state detection section such as an encoder in accordance with the detecting position or the direction of detecting movement may be installed.

According to this embodiment, the following effect can be obtained.

In the embodiment aforementioned, when controlling the stepping motor for driving the load, if the detection result after the drive state of the load is changed is beyond the prescribed range, the controller controls so as to maintain the driving speed of the load and if the detection result after the drive state of the load is changed is within the prescribed range, it controls the drive state of the load based on the control pattern.

Here, as a detection result of the load drive state, the range within which the stepping motor is not in the step-out state and the drive state can be controlled stably based on the control pattern is predetermined as a "prescribed range".

As mentioned above, the movement of the load is detected, thus the situation that the movement of the load is reflected on the stepping motor and it falls into the step-out state can be prevented beforehand, thus stable drive is enabled.

Further, the controller executes control for recovering a variance generated when the detection result of the load drive state is beyond the prescribed range and the drive state of the load is maintained, so that the original desired drive state can be maintained.

Furthermore, in a configuration that the load is driven via the transmission section for transmitting the drive by the stepping motor, due to the deflection caused to the transmission section, between the drive state of the stepping motor and the driven state of the load, a variance is generated easily. When detecting the movement of the load in this situation, the situation that the movement of the load is reflected on the stepping motor and it falls into the step-out state can be prevented beforehand, thus stable drive is enabled.

Furthermore, when transmitting the drive by the stepping motor, in a configuration that the load is driven via a transmission section using connection section such as a gear, a belt, and a gear which are connected to each other, due to the deflection caused to the transmission section, between the drive state of the stepping motor and the driven state of the load, a variance is generated easily. When detecting the movement of the load in this situation, the situation that the movement of the load is reflected on the stepping motor and it falls into the step-out state can be prevented beforehand, thus stable drive is enabled.

Furthermore, when controlling the forward rotation and reverse rotation of the stepping motor, due to the deflection caused when switching the forward rotation and reverse rotation, between the drive state of the stepping motor and the driven state of the load, a variance is generated easily. When detecting the movement of the load in this situation, the situation that the movement of the load is reflected on the stepping motor and it falls into the step-out state can be prevented beforehand, thus stable drive is enabled.

What is claimed is:

1. A stepping motor controller for controlling a stepping motor which drives a load, comprising:
    a load drive state detection section structured to detect a driving state of the load driven by the stepping motor; and
    a control section structured to monitor whether a speed fluctuation of the load detected by the load drive state detection section is within a prescribed range or beyond the prescribed range, wherein the prescribed range is predetermined such that the stepping motor is not put into the step-out state and the driving state can be controlled stably when the speed fluctuation of the load is within the prescribed range, and control the stepping motor, when a detection result of the load drive state detection section is beyond a prescribed range, so as to maintain a driving speed of the load, and when the detection result of the load drive state detection section is within the prescribed range, so as to control the driving state of the load based on a control pattern.

2. The stepping motor controller of claim 1, wherein in cases where the detection result of the load drive state detection section is beyond the prescribed range and the driving speed of the load has been maintained to generate a variance, the control section controls the stepping motor to recover the variance.

3. The stepping motor controller of claim 1, wherein the load is driven via a transmission section, which transmits a drive by the stepping motor.

4. The stepping motor controller of claim 2, wherein the load is driven via a transmission section, which transmits a drive by the stepping motor.

5. The stepping motor controller of claim 4, wherein the transmission section comprises a plurality of connection sections which are connected with each other.

6. The stepping motor controller of claim 3, wherein the transmission section comprises a plurality of connection sections which are connected with each other.

7. The stepping motor controller of claim 1, wherein the stepping motor controller controls a forward rotation and a reverse rotation of the stepping motor.

8. The stepping motor controller of claim 2, wherein the stepping motor controller controls a forward rotation and a reverse rotation of the stepping motor.

9. A stepping motor control method for controlling a stepping motor which drives a load, comprising:
    detecting a driving state of the load driven by the stepping motor;
    monitoring whether a speed fluctuation of the load is within a prescribed range or beyond the prescribed range, wherein the prescribed range is predetermined such that the stepping motor is not put into the step-out state and the driving state can be controlled stably when the speed fluctuation of the load is within the prescribed range; and
    controlling the stepping motor, when a detection result of the driving state of the load is beyond a prescribed range, so as to maintain a driving speed of the load, and when the detection result of the driving state of the load is within the prescribed range, so as to control the driving state of the load based on a control pattern.

10. The stepping motor control method of claim 9, further comprising a step of controlling the stepping motor to recover the variance, in cases where the detection result of the load drive state detection section is beyond the prescribed range, and the driving speed of the load has been maintained to generate a variance.

11. The stepping motor control method of claim 9, wherein the load is driven via a transmission section, which transmits a drive by the stepping motor.

12. The stepping motor control method of claim 10, wherein the load is driven via a transmission section, which transmits a drive by the stepping motor.

13. The stepping motor control method of claim 11, wherein the transmission section comprises a plurality of connection sections which are connected with each other.

14. The stepping motor control method of claim 12, wherein the transmission section comprises a plurality of connection sections which are connected with each other.

15. The stepping motor control method of claim 9, further comprising a step of controlling a forward rotation and a reverse rotation of the stepping motor.

16. The stepping motor control method of claim 10, further comprising a step of controlling a forward rotation and a reverse rotation of the stepping motor.

17. A computer readable medium stored thereon a program for causing a computer to execute the steps of:
    detecting a driving state of the load driven by the stepping motor;
    monitoring whether a speed fluctuation of the load is within a prescribed range or beyond the prescribed range, wherein the prescribed range is predetermined such that the stepping motor is not put into the step-out state and the driving state can be controlled stably when the speed fluctuation of the load is within the prescribed range; and
    controlling the stepping motor, when a detection result of the driving state of the load is beyond a prescribed range, so as to maintain a driving speed of the load, and when the detection result of the driving state of the load is within the prescribed range, so as to control the driving state of the load based on a control pattern.

18. The computer readable medium of claim 17, further comprising the step of controlling the stepping motor to recover the variance, in cases where the detection result of the load drive state detection section is beyond the prescribed range, and the driving speed of the load has been maintained to generate a variance.

* * * * *